United States Patent [19]

Seitz

[11] Patent Number: 5,160,223
[45] Date of Patent: Nov. 3, 1992

[54] POLYMER WHEEL CHOCK FOR USE ON VEHICLE TRANSPORT CARRIERS

[75] Inventor: Robert F. Seitz, Batavia, Ill.

[73] Assignee: Gen-Tech, Inc., North Aurora, Ill.

[21] Appl. No.: 794,785

[22] Filed: Nov. 18, 1991

Related U.S. Application Data

[63] Continuation of Ser. No. 573,732, Aug. 28, 1990, abandoned.

[51] Int. Cl.$^5$ .............................................. B60P 3/07
[52] U.S. Cl. .......................................... 410/9; 410/10; 410/20; 410/30
[58] Field of Search ..................... 410/8–12, 410/19, 20, 22, 30, 66, 74, 75; 188/4 R, 32, 36

[56] References Cited

U.S. PATENT DOCUMENTS

| | | | |
|---|---|---|---|
| 2,725,958 | 12/1955 | Porter et al. | 188/32 |
| 2,954,101 | 9/1960 | Corson | 188/32 |
| 3,673,969 | 7/1972 | Peisner et al. | 410/12 |
| 4,615,416 | 10/1986 | Wilson | 188/32 |
| 4,659,266 | 4/1987 | Thelen et al. | 410/19 X |
| 4,679,974 | 7/1987 | Blunden | 410/30 |
| 4,836,726 | 6/1989 | Robertson et al. | 410/30 X |
| 4,838,743 | 6/1989 | Blunden et al. | 410/30 X |
| 4,871,291 | 10/1989 | Moore et al. | 410/30 X |
| 4,875,813 | 10/1989 | Moyer et al. | 410/30 X |

FOREIGN PATENT DOCUMENTS 1469877 2/1965 France .................................. 410/30

Primary Examiner—Michael S. Huppert
Assistant Examiner—William M. Hienz
Attorney, Agent, or Firm—Kinzer, Plyer, Dorn McEachran & Jambor

[57] ABSTRACT

A chock for use in securing four wheel vehicles to a deck mounted rail of a transport carrier is formed of a polymer body which has a pocket formed and adapted to mount the body laterally over a deck mounted rail having a series of transverse openings. A pin is mounted in the body for movement into a rail opening to secure the chock to the rail. The pin is mounted in a bushing which is encased in the polymer chock body and there is a vertical load member extending upwardly from the bushing, with the vertical load member being encased in the polymer chock body to distribute vertical loads through the body. The pocket has spaced walls which extend generally parallel to and closely adjacent the rail. Portions of the pocket walls adjacent the termination of the pocket at the exterior of the chock body are recessed away from the rail so that a transverse load applied to the chock, which causes the pocket walls to contact the rail, is distributed over a substantial portion of the chock body adjacent the pocket walls and from the pocket exterior toward the pocket interior.

3 Claims, 2 Drawing Sheets

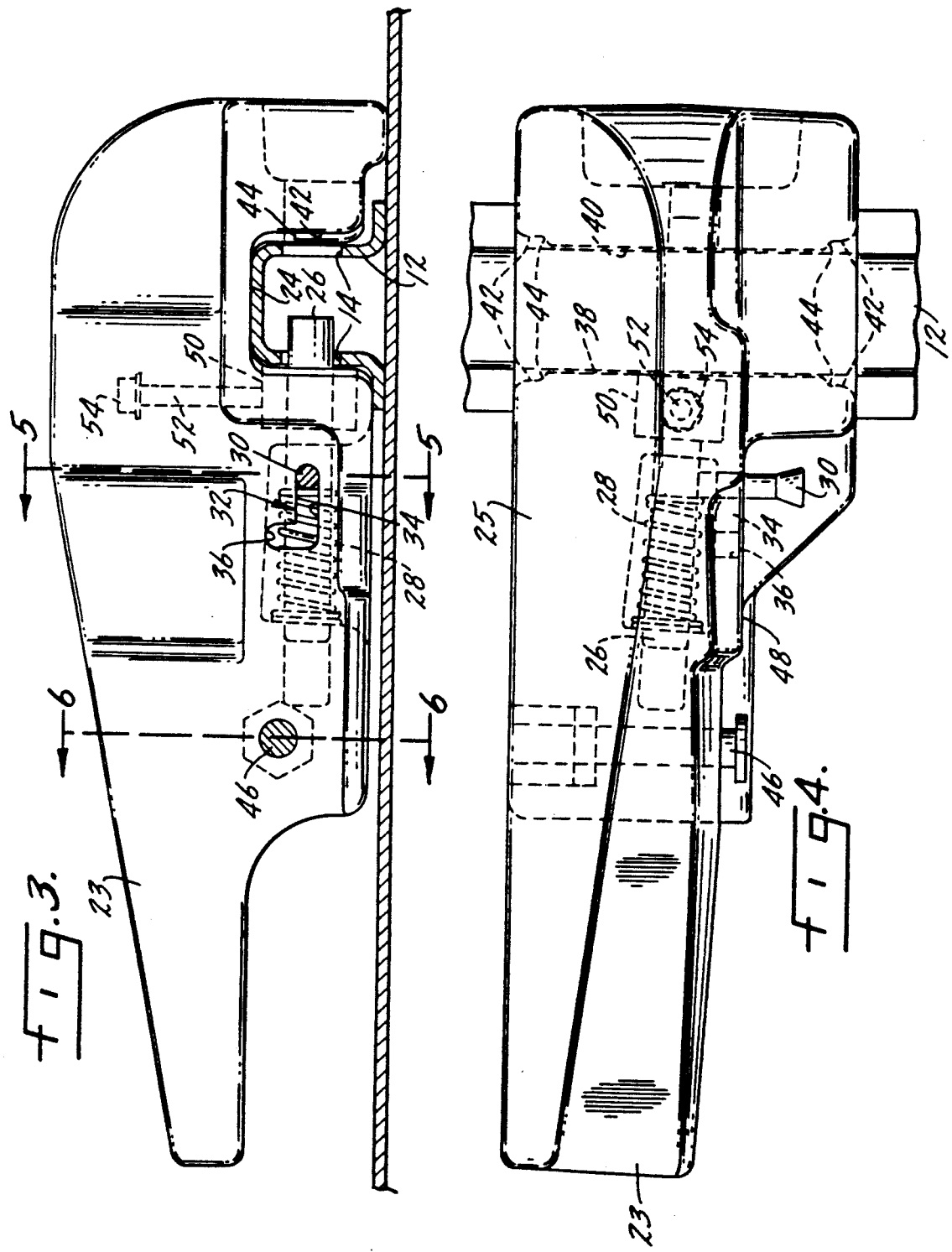

POLYMER WHEEL CHOCK FOR USE ON VEHICLE TRANSPORT CARRIERS

This is a continuation of co-pending application Ser. No. 07/573,732 filed on Aug. 28, 1990, now abandoned.

SUMMARY OF THE INVENTION

The present invention relates to chocks for use in securing four wheel vehicles to the deck mounted rail of a transport carrier, such as a rail car. More specifically, the invention relates to such a chock in which the body is formed of a polymer.

A primary purpose of the invention is a polymer chock for the use described in which portions of the walls of the rail receiving pocket are recessed to distribute the transverse load from the rail over a substantial portion of the chock pocket walls.

Another purpose of the invention is to provide a chock of the type described in which the pin which secures the chock to the rail is mounted in a bushing and a vertical load member extends upwardly from the bushing to thereby distribute vertical load on the chock over a substantial portion of the chock cross section.

Another purpose is a chock formed of a polymer, as described, in which the axis of the pin which secures the chock to the rail, is offset to provide chock walls of uniform thickness in the area adjacent the chock winch.

Other purposes will appear in the ensuing specification, drawings and claims.

BRIEF DESCRIPTION OF THE DRAWINGS

The invention is illustrated diagrammatically in the following drawings wherein:

FIG. 3 is a side view of the chock of FIG. 2, FIG. 4 is a top view of the chock of FIGS. 2 and 3.

BACKGROUND OF THE INVENTION

Figure 1:
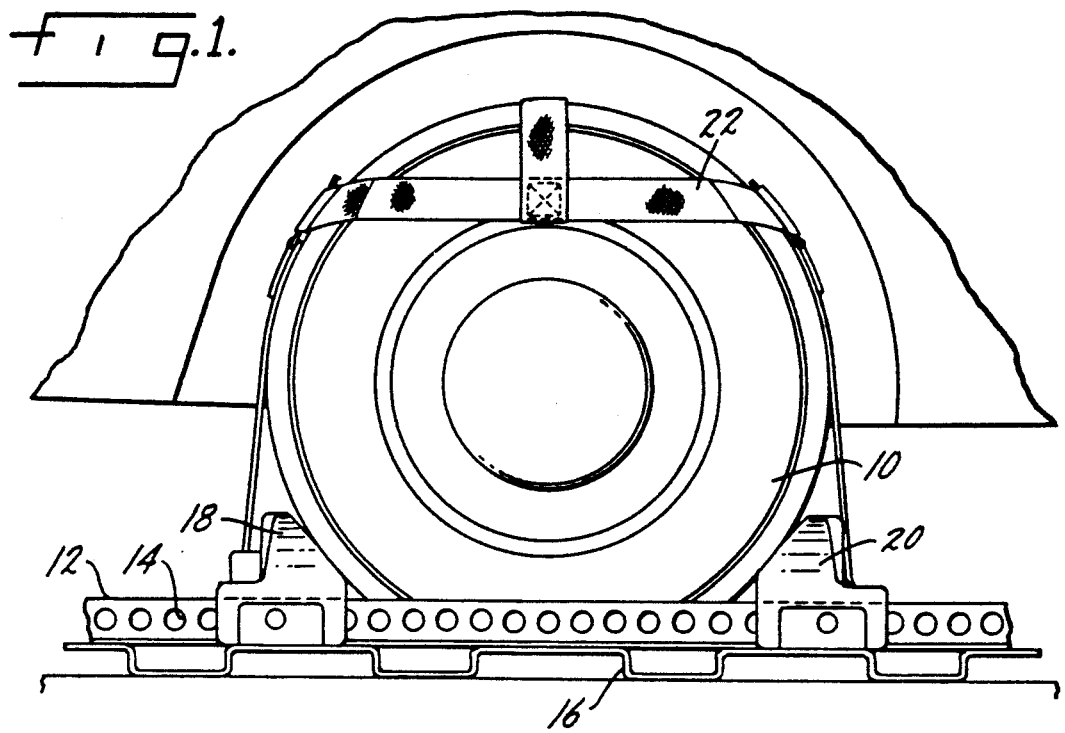
FIG. 1 is a side view of a vehicle wheel attached to the rail of a transport carrier, with the wheel being secured by a pair of chocks, as described herein.

The present invention relates to chocks for use in securing four wheel vehicles, such as automobiles and the like, to a vehicle carrier, conventionally a rail car. U.S. Pat. Nos. 4,836,726 and 4,838,743 show a similar type of chock in which the chock body is formed of steel plates. The present invention provides a chock of this general configuration which is formed of a strong polymer, which has a marked advantage over the steel chocks of the '726 and '743 patents in that it is lighter in weight, and will not damage a vehicle through accidental contact. The chock of the present invention is molded or cast with the specific configuration of the walls of the chock being made to both decrease weight and provide substantial strength and load resistance where needed.

DESCRIPTION OF THE PREFERRED EMBODIMENT

In the drawings, a wheel 10 of a typical four wheel vehicle, for example an automobile, is shown secured to a rail 12 having a plurality of openings 14, with the rail being mounted on the deck 16 of a transport vehicle such as a rail car. Chocks 18 and 20 are used to secure a web 22 over the wheel 10. Chocks 18 and 20 have the same construction features, except one is a left-hand chock and the other is a right-hand chock.

Figures 2, 5:
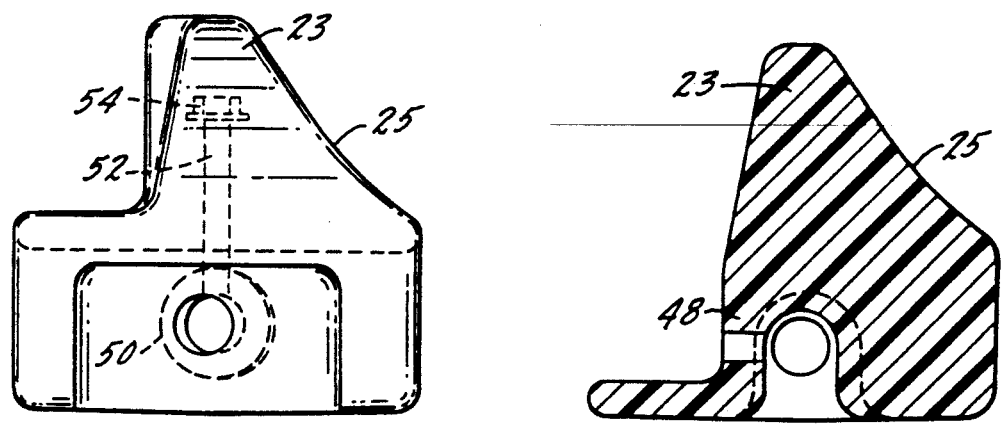
FIG. 2 is an enlarged front view of the chock of FIG. 1.
FIG. 5 is a section along plane 5—5 of FIG. 3.
Figure 6:
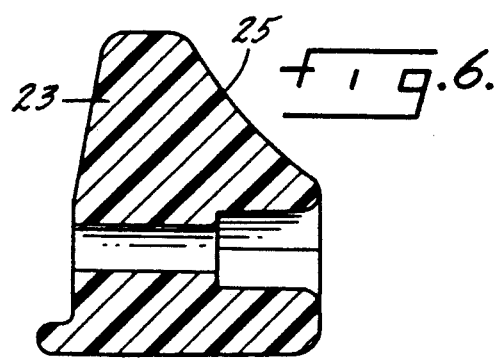
FIG. 6 is a section along plane 6—6 of FIG. 3.

As illustrated in FIGS. 2-6, each chock has a body 24 which may be molded or cast of a high strength polymer. Various types of plastics are suitable, and what is important is to use a polymer which has adequate strength and which is sufficiently light in weight that it may be easily positioned for use by a railroad train man. Body 23 has a wheel engaging surface 25, shown particularly in FIGS. 5 and 6, which is slanted, but has a slight curvature to accomodate the shape of the vehicle wheel 10.

As particularly shown in FIG. 3, chock body 24 has a pocket 24 which is formed and adapted to closely fit over the generally U-shaped rail 12. A pin 26 is movably mounted within the chock body and is biased by a load spring 28 to a position in which the pin is inserted within one of the holes 14 in the rail 12. An actuating lever 30 extends outwardly from pin 26 and is positioned within a slot 32 in the chock body 24. Slot 32 has a horizontally extending portion 34 and a vertical portion 36. When the chock is to be released from rail 12, lever 30 is pulled away from the rail and once it is in alignment with the vertically extending portion 36 of slot 32, the lever is moved upwardly to lock the pin in the retracted position.

When a vehicle is mounted on a chock as described, loads derived from train movement will be applied, through the chock to the vehicle. Such loads may tend to cause the chock to pivot relative to the rail, causing contact between rail 12 and closely adjacent and parallel walls 38 and 40 of chock pocket 24. The load applied to the chock body from the rail would normally be concentrated at the point of contact between the rail and the pocket walls with some distribution of load inboard from the point of contact. To avoid such stress concentration, the outboard or exterior of each chock pocket wall is recessed, as at 42. The result of such a recessed area is to distribute the load applied to the chock by the rail, both inboard and outboard of the point of contact which will be generally adjacent the termination of the recess, as indicated at 44. The stress will be distributed generally from the exterior of the pocket wall toward the interior and over a substantial portion of the pocket wall.

As particularly shown in FIG. 4, the tightening and loosening of web 22 over the vehicle wheel 10 is brought about by a winch, which is attached to the chock by a bolt 46. Bolt 46 passes through the body of the chock and it is desired to position the winch and web as close to the vertical centerline of the tire as possible, while not reducing the wall thickness of the chock in the area of the winch attachment and tire support. This tends to move the winch toward the axis of movement of pin 26. In order to avoid reducing the thickness of the chock wall adjacent the winch, the axis of movement of pin 26 diverges slightly from a line perpendicular to rail 12 and pocket walls 38 and 40. As particularly shown in FIG. 4, if the pin were not canted, the thickness of wall 48 which is directly adjacent the winch would have to be thinner than shown. By moving the axis of movement of pin 26 away from wall 48, it is possible to maintain full wall thickness in all areas.

Pin 26 moves along the described axis and the end of the pin adjacent pocket wall 38 is supported in a bushing 50. The bushing is embedded or encased in the body of the chock. The pin moves through the bushing and any load applied to the pin will be applied to the bushing and thus will be distributed throughout the body of the chock. In order to protect against excessive loads on the bushing, a vertically extending rod or load member 52 is attached to the top of the bushing and extends upwardly in the chock body. Load member 52 has an enlarged head 54. The load member and its enlarged head will be positioned in the mold prior to casting of the chock body and thus will be completely surrounded and encased in the material of the chock. A vertical load applied to pin 26 is applied to the bushing and from the bushing to the load member. This load will be distributed throughout a substantial vertical cross section of the chock because of the enlarged head 54 of load member 52.

The present invention provides a chock for the use described in which the conventional chock made out of steel plate is replaced by a lighter weight chock formed of a material which will lessen damage to the vehicle on the carrier if there is accidental contact. In order to prevent concentration of stress on different parts of the chock body caused by loads on the chock from the rail or pin 26, there are certain defined configurations of the chock body to spread the load. The recesses 42 prevent high stress concentration on the walls of the chock pocket. Changing the axis of movement of pin 26 allows the chock to have full wall thickness in the area of the web winch and tire supporting wall. Bushing 50 and load member 52 with its enlarged head 54 provide a means for distributing vertical loads throughout a substantial portion of the chock body.

Whereas the preferred form of the invention has been shown and described herein, it should be realized that there may be many modifications, substitutions and alterations thereto.

The embodiments of the invention in which an exclusive property or privilege is claimed are defined as follows:

1. A chock for use in securing four wheel vehicles to a deck mounted rail of a transport carrier including a polymer body having a pocket formed and adapted to mount the body laterally over a deck mounted rail having a series of transverse openings therein, said pocket having spaced walls which extended generally parallel to and closely adjacent the rail, a pin movably mounted in said body and positioned to be moved into one of the rail openings to secure the chock body to the rail, a bushing supporting said pin adjacent one of the pocket walls, said bushing being enclosed by said polymer chock body, a thin, elongated vertical load member attached to and extending from said bushing toward the top of said chock and to a level above the pocket, said load member being encased by said polymer chock body, said vertical load member having an enlarged area at the upper end thereof, which enlarged area distributes the vertical load on the chock through a substantial vertical cross section of the chock body.

2. The chock of claim 1 further characterized in that the pin moves in a horizontal plane and along a horizontal axis which diverges slightly from a horizontal line perpendicular to the rail and the pocket walls.

3. The chock of claim 2 further characterized in that said pin is spring biased toward a position in which it is inserted into one of the rail openings.

* * * * *